United States Patent [19]

Strauss et al.

[11] 4,075,638
[45] Feb. 21, 1978

[54] CAMERA WITH AUTOMATIC EXPOSURE FACTOR MECHANISM

[75] Inventors: Karl-Peter Strauss, Volkmarode; Dietmar Elke, Braunschweig, both of Germany

[73] Assignee: Rollei-Werke Franke & Heidecke, Braunschweig, Germany

[21] Appl. No.: 751,868

[22] Filed: Dec. 17, 1976

[30] Foreign Application Priority Data

Dec. 20, 1975 Germany .............................. 2557682

[51] Int. Cl.² .............................................. G03B 17/20
[52] U.S. Cl. .................................. 354/23 D; 354/53; 354/60 L
[58] Field of Search ....................... 354/53, 54, 55, 56, 354/60 E, 60 L, 289, 23 D; 356/226, 227

[56] References Cited

U.S. PATENT DOCUMENTS 3,843,249  10/1974  Kitaura ........................... 354/289 X

FOREIGN PATENT DOCUMENTS 2,357,601  5/1975  Germany .............................. 354/53
2,436,184  2/1975  Germany .............................. 354/53

Primary Examiner—L. T. Hix
Assistant Examiner—M. L. Gellner
Attorney, Agent, or Firm—Stonebraker, Shepard & Stephens

[57] ABSTRACT

A photographic camera in which at least one of the two main exposure factors (shutter speed and diaphragm aperture) may be set either manually or automatically. Indicating means is provided, visible in the viewfinder of the camera, to indicate to the user both the exposure factor value which he has set manually (if any) and the exposure factor value which the automatic mechanism would select according to prevailing light conditions, regardless of whether the user plans to utilize the automatic setting feature or whether he prefers to set the factor manually.

13 Claims, 2 Drawing Figures

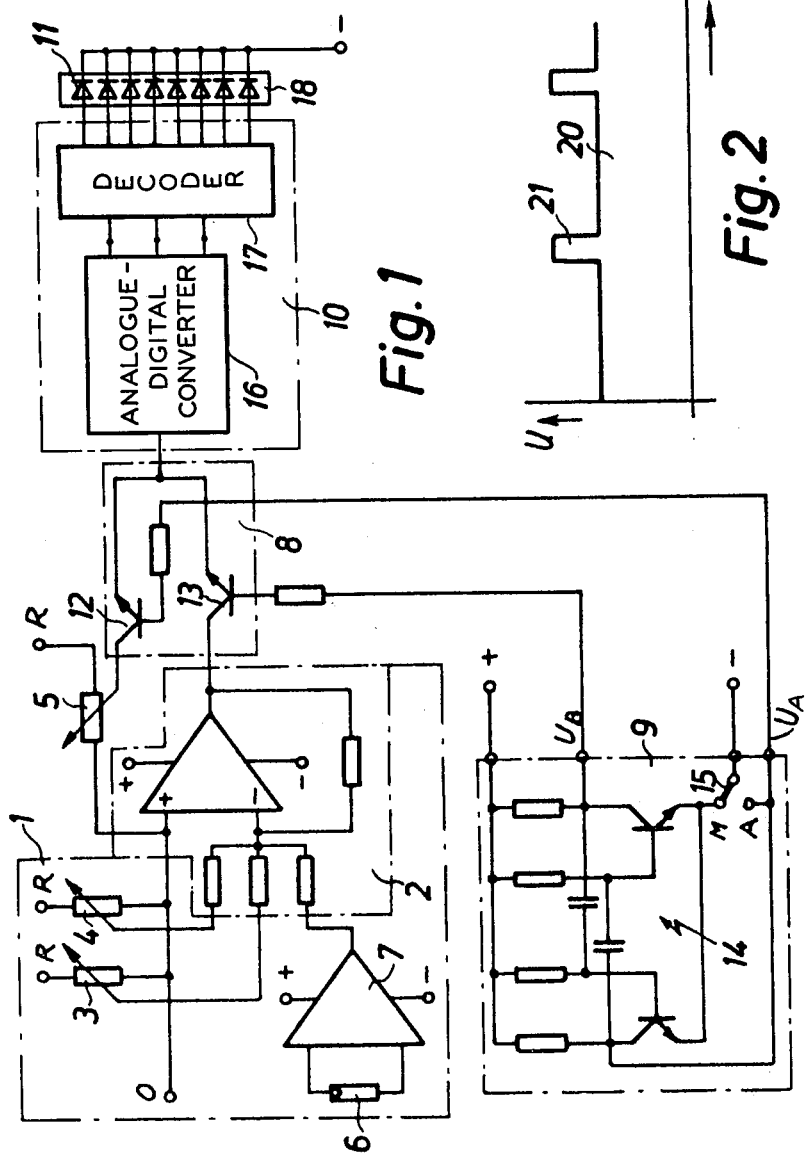

CAMERA WITH AUTOMATIC EXPOSURE FACTOR MECHANISM

BACKGROUND OF THE INVENTION

Many cameras are known in the art, in which at least one of the exposure factors may be set either manually or automatically, the automatic setting being in accordance with prevailing light conditions as sensed by the automatic mechanism. As well known in the art, there are three exposure factors, one being the shutter speed (that is, duration of each exposure), another being the diaphragm aperture, and the third being the film sensitivity or film speed. For purposes of the present discussion, the two basic exposure factors are shutter speed and diaphragm aperture, which frequently need to be varied from one exposure to the next, whereas the factor of film sensitivity is relatively constant, as it is always the same for any one loading of the camera with a roll of film, and needs to be changed only when the camera is loaded with a fresh roll of film having a different sensitivity or film speed.

In many cameras according to the prior art, there is provision for indicating, in the viewfinder of the camera, the factor value which would be set by the automatic setting mechanism, but no provision for easy and quick comparison of this value with the actual value which the user sets manually, when he prefers manual control of the camera. Thus the user must put the viewfinder of the camera to his eye in order to see, in the viewfinder, the exposure value determined by the light-responsive mechanism of the camera, and then must remove the camera from his eye to look at the graduation on the manual setting knob or ring, to see the value which he has set manually, and must then return the camera to his eye to complete composing the picture and making the exposure. This is both awkward and time-consuming.

It has also been suggested that, when switching over from automatic operation to manual operation, the same indicating means visible in the viewfinder to indicate the value set automatically could also be used to indicate the value set manually, so that the user would not have to remove the camera from his eye and look at the graduations on the setting knob or ring. However, in that case the automatic value would no longer be visible, so that the operator would not have any basis for comparison of the exposure value which he decides to set manually with the exposure value which would be set by the automatic mechanism if he were to take advantage of the automatic setting.

An object of the present invention is to provide means for indicating to the user of the camera, preferably in a position visible through the viewfinder, both the exposure value factor which the automatic mechanism of the camera would select on the basis of prevailing light conditions, and the exposure value which the user selects manually. By providing both indications concomitantly or substantially concomitantly, the user can thus see at a glance whether he is setting the controls to the same value which the automatic mechansim would select, or to a different value, and can also see how much difference there may be between the value he wishes to select automatically and the value which the automatic mechanism of the camera would select. This makes it easy for the photographer to obtain exactly the effect he desires, enabling him quickly to select, for example, a shutter speed somewhat faster or somewhat slower than the speed which would be selected by the automatic mechanism, or a diaphragm aperture somewhat smaller or somewhat larger than the aperture which would be selected by the automatic mechanism.

Another object of the invention is to provide for mechanism which will achieve the above mentioned object in a manner which is both simple and comparatively inexpensive, utilizing so far as possible the same parts or components for the manual value indication as are used for the automatic value indication.

Still another object is to achieve these results in such a way that the user of the camera can readily observe the two values (automatic and manual) substantially simultaneously or concomitantly, the two values being given such a way that they are readily distinguishable from each other.

According to one embodiment of the invention, the values are indicated by light sources such as light emitting diodes (LED) visible in the viewfinder, different light sources indicating different values. The automatic and manual values may be distinguished by flashing the light sources, the frequency and duration of flashing for the manual indication being materially different from the frequency and/or duration of flashing of the automatic indicator. Other ways of distinguishing between the two indications are by the use of different colors of light, or materially and noticably different intensities of light. Although these are possibilities within the scope of the invention, it is preferred to use the same color and same intensity for both indications, as this permits the economy of using the same LED for both indications, distinguishing one from the other by readily observable differences in frequency and/or duration of the respective flashes.

According to a preferred embodiment of the invention, the light sources are connected to the outputs of a control circuit, which outputs are actuated selectively according to the manually selected or automatically formed exposure factor values (shutter speed or diaphragm aperture), and the input of the control circuit is connected with an electronic changeover switch which, in the case of manual camera operation, charges the input of the control circuit alternately with a signal derived from the manually selected exposure value and a signal derived from the automatically formed exposure value.

According to another aspect of the invention, the electronic changeover switch is controlled in such a way that, when the camera is set for automatic operation, the input of the control circuit is constantly charged with a signal derived from the automatic exposure factor. Thus during automatic operation of the camera, the value of the particular exposure factor (shutter speed or diaphragm aperture) which is being dealt with is signalled to the operator by constant illumination of the particular light source (e.g., a LED) allocated to or intended to indicate this particular exposure value.

According to another feature of the invention, the electronic switch is controlled by a pulse generator which emits a pulse sequence having a keying ratio which is materially different from one, that is, very much greater or very much less than one. In the case of manual operation of the camera, two flashing signals with different flash durations can be seen in the viewfinder, and thus it is possible to distinguish easily between the manually selected value and the theoretical optimum value determined by the automatic mechanism.

In accordance with a still further development of the invention, the electronic changeover switch is provided in a very simple manner, having two transistors one of which is connected between the input of the control circuit for the indicator device and the output of the circuit arrangement for the automatic value determination, the other transistor being connected between the input of the control circuit and the output of the manual selector, the bases of the two transistors being each connected with an output of a strongly asymmetrical astable multivibrator.

In a further feature of the invention, the multivibrator is switched on when the exposure value is to be determined manually, and is switched off when the exposure factor is to be determined automatically, and the transistor connected with the output of the circuit for automatic operation is kept constantly conductive. Thus during manual control of the exposure factor, the input of the control circuit can be charged alternately with signals derived from the manually selected and the automatically formed exposure values, while in automatic operation of the camera only the signal derived from the automatically formed exposure value is present uninterruptedly at the input of the control circuit.

Another feature of the invention relates to the arrangement of the changeover switch. This switch is arranged in the circuit of the multivibrator in such a way that, when set for manual operation, the switch connects the multivibrator with a voltage source, and when set for automatic operation, it connects the base of the transistor connected with the circuit arrangement for automatic operation to ignition potential, and connects the base of the transistor connected with the exposure time or diaphragm aperture selector to blocking potential. In this way the circuitry expense in the switching over of the camera into one or the other type of operation can be kept low for the indicator device.

In the preferred embodiment of the invention, the indicating light sources are formed as luminous diodes or light emitting diodes (LED) arranged in a line. Thus it is possible to form the indicating device with minimum dimensions, arranged in a line along one edge of the viewfinder image area in the camera.

BRIEF DESCRIPTION OF THE DRAWINGS

FIG. 1 is a circuit diagram of mechanism in accordance with a preferred embodiment of the invention; and FIG. 2 is a voltage-time diagram at the output of the electronic changeover switch in the case of manual camera operation.

DESCRIPTION OF THE PREFERRED EMBODIMENT

Referring now to FIG 1, there is a circuit arrangement indicated in general at 1 which automatically determines one of the exposure factors necessary for optimum exposure in dependence upon the prevailing illumination of the subject being photographed. This factor may be either the factor of exposure duration (shutter speed) or the factor of diaphragm aperture, both of these types of automatic cameras being well known in the art.

This circuit arrangement 1 comprises an analogue computer 2, the non-inverting input of which is connected to the center potential, designated by "O", of a direct-current voltage source which feeds the entire electric circuit arrangement. The positive pole of the direct-current source is designated by "+" and the negative pole of the direct-current source by "−". Between this center potential and a reference potential R three potentiometers are connected. The potentiometer 3 serves for the setting of the film sensitivity. In a camera with automatic shutter speed control, the diaphragm aperture or stop is preselected by means of the potentiometer 4 and in manual operation of the camera the desired exposure time (shutter speed) is set with the potentiometer 5. In the case of a camera with automatic diaphragm aperture control, the shutter speed is preselected by means of the potentiometer 4 and in manual operation of the camera the desired diaphragm aperture or stop is set by means of the potentiometer 5.

The potentiometer tappings of the potentiometers 3 and 4 are connected with the inverting input of the analogue computer 2. A photoelectric cell 6 which measures the subject brightness (i.e., the light reflected from the subject being photographed) is also connected to the inverting input of the computer 2 through an amplifier 7. The potentiometer tapping of the potentiometer 5 and the output of the operational amplifier 2 are connected through an electronic changeover switch indicated in general at 8, which is actuated by a pulse generator indicated in general at 9, with a control circuit indicated in general at 10 to the outputs of which is connected an indicator device consisting of luminous diodes 11, the luminous diodes being assembled into an 8-stage LED-line 18.

The electronic changeover switch 8 consists of two npn-transistors 12 and 13. The collector-emitter path of the transistor 12 is connected with the potentiometer tapping of the potentiometer 5 and the input of the control circuit 10. The collector-emitter path of the transistor 13 is connected with the output of the analogue computer 2 and with the input of the control circuit 10.

The pulse generator 9 which actuates the electronic changeover switch 8 is formed as a strongly asymmetric astable multivibrator 14, of which one output $U_A$ is connected with the base of the transistor 12 and the other output $U_B$ is connected with the base of the transistor 13. The formation of an astable multivibrator is generally known, so that it is here possible to dispense with further description thereof. In departure from a known multivibrator, however, a changeover switch 15 which can assume two switch positions A and M is arranged in the connecting lead between the mutually connected emitters of the multivibrator transistors and the minus pole of the direct-current voltage source. In the switch position M for manual camera operation, the multivibrator is connected with its voltage source and works in the known manner, the keying ratio of the pulse sequence present at its outputs being substantially greater or less than one. In the position A for automatic operation (automatic diaphragm or shutter time) the multivibrator 14 is switched off and the base of the transistor 12 is connected directly with the minus pole of the direct-current voltage source. Due to switching off of the multivibrator the potential of the plus pole of the direct-current voltage source is present on the base of the transistor 13, and the transistor 13 is constantly conductive while the transistor 12 is securely locked or non-conductive.

The control circuit 10 for actuation of the luminous diodes 11 has an analogue-digital converter 16 which converts the analogue signal coming from the analogue computer 2 or from the time or diaphragm setting potentiometer 5 to the input of the control circuit into a corresponding digital combination. Such analogue-digital converters are known and available on the market as integrated circuits, so that a description is superfluous here. With the three outputs of the analogue-digital converter a decoder 17 is connected, which decodes the digital combination of the converter and according to its output signal actuates one of its eight outputs. With each of the eight outputs there is connected a light emitting diode 11 which lights up as soon as the respective output of the decoder is actuated. Each of the luminous diodes is allocated to a specific exposure time in the case of a camera with automatic timer and to a specific diaphragm stop in the case of a camera with automatic diaphragm.

The operation of this circuit arrangement is described below, in the case of a camera with automatic timer or shutter speed control.

The film sensitivity is set on the potentiometer 3 and the desired diaphragm aperture is set on the potentiometer 4. If the exposure time setting is to take place automatically, the automatic timer is to be switched on, that is to say the changeover switch 15 is to be placed into its A-position. A signal corresponding to the subject brightness is passed by the photoelectric cell 6 to the inverting input of the analogue computer 2. The signals arriving at the same input of the computer from the potentiometer 3 and potentiometer 4 are added and at the output of the computer there stands a control signal analogous to the requisite exposure time. This signal may be used in the conventional manner to set the shutter speed control of the conventional camera, details of which are unimportant for purposes of the present invention. Since as described above when the changeover switch 15 is in the A-position the transistor 13 is constantly conductive, this signal is present constantly at the input of the control circuit 10. The analogue-digital converter 16 converts this analogue signal into a corresponding digital combination which is decoded by the decoder 17, and a luminous diode 11 allocated to this digital combination lights up and indicates the calculated exposure time. The photographer can read off the exposure time to be expected in the exposure by the lighting up of the diode, preferably in the viewfinder of the camera.

For the manual operation of the camera the changeover switch 15 is to be shifted into its switch position M. Thus the astable multivibrator 14 is switched on and delivers alternately a positive pulse to the bases of the transistor 12 and of the transistor 13. While the positive pulse is present for a relatively very long time (about 250 ms) at the base of the transistor 12, the pulse duration of the pulse present on the base 13 amounts to only a fraction of the pulse duration of the other pulse (about 20 ms). As described above, in the same way a signal is formed from the subject brightness and the set film sensitivity and diaphragm stop, through the analogue computer 2, which signal corresponds to an exposure time necessary for an optimum exposure. Now the exposure time with which the picture is to be exposed is set on the potentiometer 5. Since the transistor 12 and the transistor 13 are opened in alternation for different time periods, a control signal is present at the input of the control circuit 10 according to FIG. 2. Here the signal 20 represents the manually set exposure time and the signal 21 the automatically determined optimum exposure time. Both the analogue signal 20 and the analogue signal 21 are converted into a corresponding digital combination, which combinations are converted through the decoder 17 into corresponding control signals for the luminous diodes 11.

In conformity with the signals 20 and 21, two luminous diodes 11 ight up alternately, their duration of lighting being determined by the duration of switching on of the transistors 12 and 13 respectively. The exposure time set manually with the potentiometer 5 is expressed to the photographer by periodically recurring long-lasting flashing signals, while the automatically formed optimum exposure time is signalled by periodically recurring light pulses of shorter duration. The photographer is able by adjusting the potentiometer 5 to vary the manually set exposure time so that a greater or lesser exposure time difference occurs between the optimum exposure time and the exposure time which he has set manually, or to bring the two flashing signals into coincidence if desired. In the latter case then a luminous diode 11 lights up constantly and thus the photographer knows that the exposure time which he has set is also the exposure time which would be to be expected in the case of automatic timing being set.

If the camera is one in which the automatically determined factor is diaphragm aperture rather than shutter speed, the camera operates in the same way except that the long duration flashes will represent the theoretical optimum diaphragm aperture determined by the automatic mechanism and the shorter flashes will represent the actual diaphragm aperture set manually. Of course the long and short flashes can be reversed if desired, in either type of camera.

Of course the circuit arrangement according to the invention can also be used in cameras in which both an automatic timer and an automatic diaphragm are present, which can be switched on according to choice. Here an indicator device for the diaphragm values and an indicator device for the exposure times must be provided.

The individual light emitting diodes may be allocated to different values of the exposure factor in any desired way. For example, when dealing with shutter speed, the first LED in the line 18 may represent a shutter speed of 1 second, the next one-half second, and so on successively through one-fourth, one-eighth, one-fifteenth, one-thirtieth, etc. When dealing with the factor of diaphragm aperture, one LED may represent f/2.8, another f/4, another f/5.6, and so on.

While it is preferred to differentiate the indication of the automatically determined exposure factor from the indication of the manually set factor by using light flashes of conspicuously different duration from the same set of light sources, yet it is within the scope of the invention, as already indicated above, to use two separate sets of light sources (two lines of LEDs) having either different color or different intensity (brightness) or both.

What is claimed is:

1. A camera in which an exposure factor is determined automatically in accordance with prevailing illumination conditions and which may be selectively operated either in automatic mode with said factor set in accordance with its automatic determination or in manual mode with said factor set manually, said camera comprising indicating means for indicating both the automatically determined exposure factor and the manually set exposure factor when the camera is operated in manual mode, said indicating means including a plurality of light sources respectively representing different values of said factor.

2. A camera as defined in claim 1, wherein the indications of the automatically determined factor value and the manually set factor value are given by means of distinguishable flashing signals.

3. A camera as defined in claim 2, wherein the flashing signals representing automatically determined factor values have different flashing durations from those representing manually set factor values.

4. A camera as defined in claim 1, wherein said light sources include a series of light emitting diodes arranged in a line.

5. A camera as defined in claim 1, further comprising electronic changeover switch means (8) having an input and an output, control circuit means (10) having an input and a plurality of outputs, a circuit operatively connecting the output of said changeover switch means to the input of said control circuit means, and means operatively connecting said light sources to the outputs of said control circuit means, said changeover switch means constituting means for delivering to the input of said control circuit means, when the camera is being operated in manual mode, a succession of signals derived alternately from said exposure factor determined automatically and from said exposure factor set manually.

6. A camera as defined in claim 5, further comprising means effective when the camera is being operated in automatic mode for delivering to the input of said control circuit means only a signal derived from said exposure factor determined automatically.

7. A camera as defined in claim 5, further comprising a pulse generator controlling said changeover switch, said pulse generator having a pulse sequence keying ratio materially different from unity.

8. A camera as defined in claim 5, further comprising a manually operable exposure value setter (5), and circuit means (1) for determining automatically an exposure factor, and an asymmetrical astable multivibrator (14) having two outputs ($U_A$ and $U_B$), said electronic changeover switch including two transistors (12 and 13), one transistor (12) having a collector-emitter path connected to said manually operable exposure value setter and to an input of said control circuit means, the other transistor (13) having a collector-emitter path connected to said circuit means for automatically determining an exposure factor and to an input of said control circuit means, each of said transistors having a base connected to one of said outputs of said multivibrator.

9. A camera as defined in claim 8, further comprising means for rendering said multivibrator effective when said camera is being operated in manual mode, and means for rendering said multivibrator ineffective and rendering the last mentioned transistor (13) constantly conductive when the camera is being operated in automatic mode.

10. A camera as defined in claim 9, further comprising a selector switch (15) shiftable to select automatic mode or manual mode of operation of the camera, and circuit means effective during manual mode of operation to connect said multivibrator to a voltage source, and effective during automatic mode of operation to connect the base of the last mentioned transistor (13) to an ignition potential and to connect the base of the other transistor (12) to a blocking potential.

11. A camera as defined in claim 1, wherein said camera has a viewfinder and wherein said indicating means is visible in the viewfinder.

12. A camera as defined in claim 1, wherein said exposure factor is shutter speed.

13. A camera as defined in claim 1, wherein said exposure factor is diaphragm aperture.

* * * * *